(12) United States Patent
Tsai

(10) Patent No.: US 8,694,898 B2
(45) Date of Patent: Apr. 8, 2014

(54) ELECTRONIC DEVICE WITH WIDGETS AND METHOD FOR CONFIGURING WIDGETS

(75) Inventor: Teng-Yu Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 273 days.

(21) Appl. No.: 13/172,136

(22) Filed: Jun. 29, 2011

(65) Prior Publication Data

US 2012/0124499 A1  May 17, 2012

(30) Foreign Application Priority Data

Nov. 6, 2010  (TW) .............................. 99139391 A

(51) Int. Cl.
*G06F 3/048* (2013.01)
*G06F 3/0481* (2013.01)

(52) U.S. Cl.
CPC .................................... *G06F 3/0481* (2013.01)
USPC ............................ 715/762; 715/761; 715/765

(58) Field of Classification Search
USPC ........................................ 715/765, 761, 762
See application file for complete search history.

(56) References Cited

U.S. PATENT DOCUMENTS

| 7,479,949 | B2 * | 1/2009 | Jobs et al. ...................... | 345/173 |
| 7,624,160 | B2 * | 11/2009 | Henderson et al. ........... | 709/219 |
| 8,400,417 | B2 * | 3/2013 | Ording et al. .................. | 345/173 |
| 2007/0074126 | A1 * | 3/2007 | Fisher et al. ................... | 715/764 |
| 2008/0174570 | A1 * | 7/2008 | Jobs et al. ...................... | 345/173 |
| 2009/0119595 | A1 * | 5/2009 | Morris et al. .................. | 715/730 |
| 2009/0177644 | A1 * | 7/2009 | Martinez et al. .................. | 707/5 |
| 2010/0023874 | A1 * | 1/2010 | Frohwein ....................... | 715/747 |
| 2012/0216139 | A1 * | 8/2012 | Ording et al. .................. | 715/773 |
| 2012/0311037 | A1 * | 12/2012 | Sivasubramaniam et al. ............................. | 709/204 |

OTHER PUBLICATIONS

The Essential Guide to User Interface Design: An Introduction to GUI Design Principles and Techniques, 3rd Edition by: Wilbert O. Galitz John Wiley & Sons Pub. Date: Apr. 16, 2007 (Galitz).*
Winget as available on http://www.autohotkey.com/ as of Aug. 4, 2009 (Winget).*
Best Weather App for Android http://androidandme.com/2009/02/r-weather-app-for-android/ available as of Feb. 2009 (Androidandme).*
Sigma Notation Series as published at http://www.regentsprep.org as of Mar. 26, 2009 (Sigma Notation Series).*
Creating Globally Unique Identifiers (GUIDs) in .NET by Richard Carr available at http://www.blackwasp.co.uk/Guids.aspx Dec. 2, 2007.*

* cited by examiner

*Primary Examiner* — William Bashore
*Assistant Examiner* — Nathan Shrewsbury
(74) *Attorney, Agent, or Firm* — Novak Druce Connolly Bove + Quigg LLP

(57) ABSTRACT

An electronic device which includes a widget management module, a processor, a source acquiring module, and a display. The widget management module adds a new window and new viewable symbols or representations (views) inside the new window. The processor counts a number of existing windows and a number of existing views in each of the existing windows, calculates a new window identification code for the new window according to the number of existing window and the number of existing views in each of the existing windows, and calculates a new view identification code for each of the new views according to the new window identification code. The source acquiring module acquires sources and data from the sources based on each of the new view identification code and associates the source information with new view corresponding to the new view identification code, leading to the display of the new views.

1 Claim, 3 Drawing Sheets

ELECTRONIC DEVICE WITH WIDGETS AND METHOD FOR CONFIGURING WIDGETS

BACKGROUND

1. Technical Field

The disclosure generally relates to an electronic device with widgets and a method for configuring the widgets.

2. Description of Related Art

In computer programming, a widget is an element of a graphical user interface (GUI) that displays information in an arrangement which is changeable by the user, such as a window or a text box. The defining characteristic of a widget is to provide a single interaction point for direct manipulation of a given kind of data. In other words, widgets are basic visual building blocks which, combined in an application, hold all the data processed by the application and all the available interactions of this data. A widget may include many types of views, such as a window, a button, an icon, a text box, etc, which are accessible from a views database. Each view in the database conventionally has a unique ID, however a great deal of storage space in the electronic device is consumed by these IDs.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming languages such as Java, C, or Assembly. One or more software instructions in the modules may be embedded in firmware, such as an EPROM. Modules may comprise logically connected logic units, such as gates and flip-flops, and programmable units such as programmable gate arrays or processors. The modules described herein may be implemented as software and/or hardware modules and may be stored in any type of computer-readable medium or other computer storage device.

An electronic device, such as a mobile phone, or a smart computer, may include widgets displayed on a graphical user interface (GUI) that display information for the benefit of the user. The content of the widgets may include a weather forecast, a clock, phone call information, or a calendar.

Figure 1:
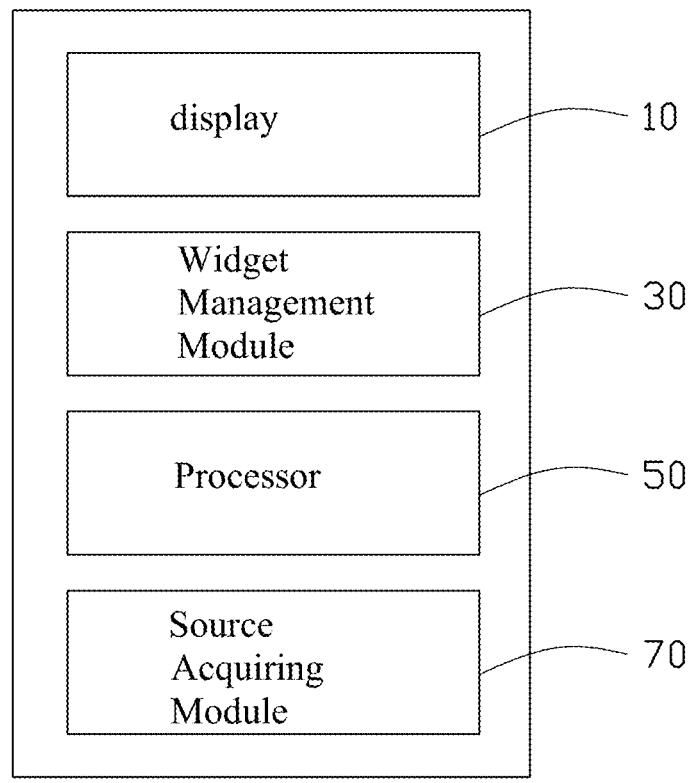
FIG. 1 is a block view of an electronic device in one embodiment.

Referring to FIG. 1, in one embodiment, an electronic device includes a display 10, a widget management module 30, a processor 50, and a source acquiring module 70. The display 10 may be a touch screen.

Figure 2:
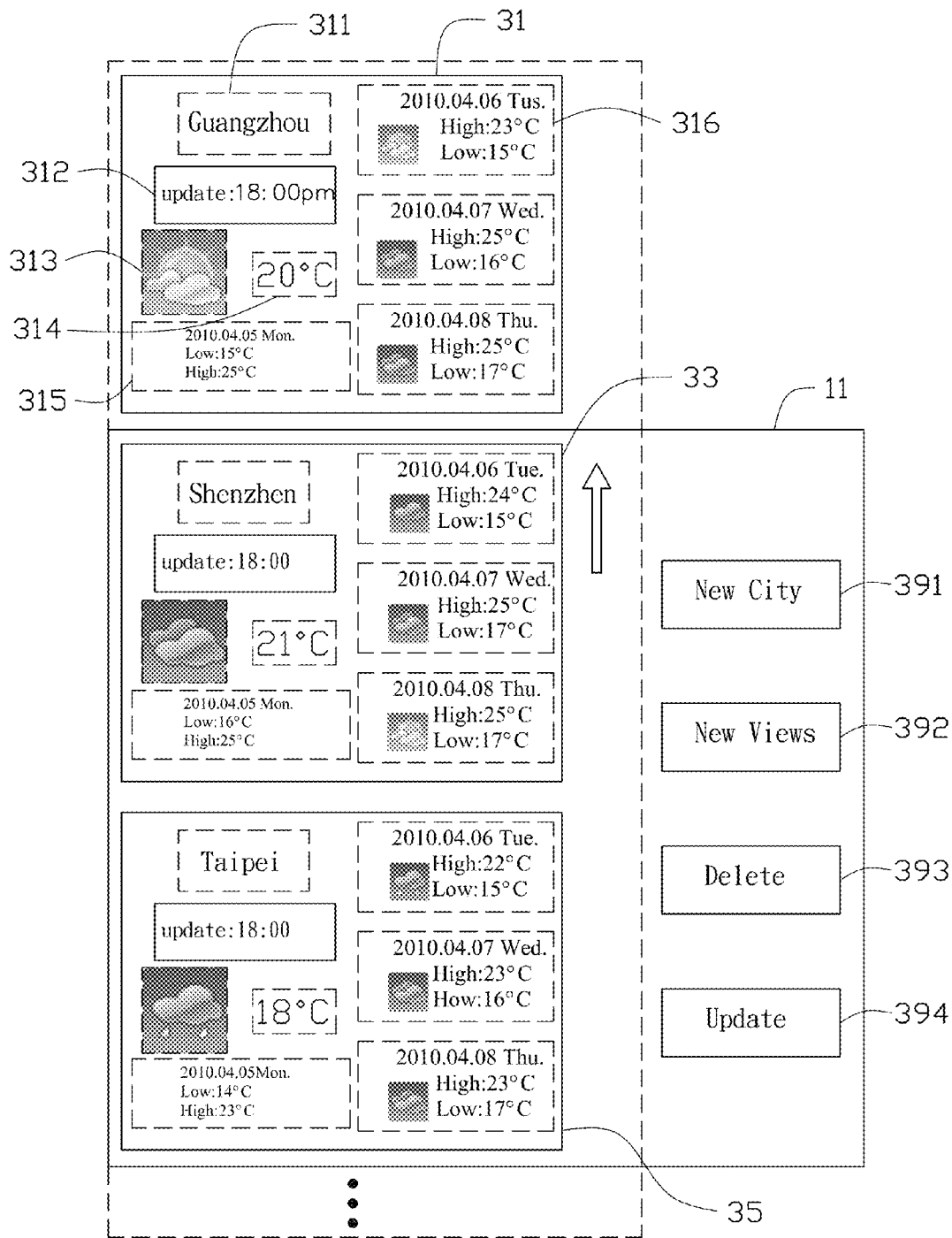
FIG. 2 is a view of a user interface with widgets in one embodiment.

Referring to FIG. 2, in one embodiment, a weather forecast widget is employed in the electronic device. An application interface may cause a GUI (GUI 11) to be displayed on the display 10. This weather forecast widget may include a first window 31, a second window 33, and a third window 35. Each of the first window 31, the second window 33, and the third window 35 may show weather forecast content in relation to one city. The second window 33 and the third window 35 are displayed in the GUI 11, and the first window 31 may be executed in background. The weather forecast widget may further include function buttons, such as a new city button 391, a new view button 392, a delete button 393, and an update button 394. Each button is used to manage the windows in the weather forecast widget. Each window may include a plurality of viewable objects, symbols, or representations, (collectively referred to hereinafter as views), such as icons, text boxes, labels etc. In one embodiment, the first window 31 may include a city name view 311, an update time view 312, an icon view 313, a current temperature view 314, a today's weather view 315, and a plurality of weather forecast views 316.

Each of the first window 31, the second window 33, and the third window 35 has an unique window identification (ID) code. Each of the views in each window also has a unique view ID code. The window ID code and the view ID code may be recorded in a device in the form of numbers.

In one embodiment, the widget management module 30 may manage the windows and the views in the weather forecast widget. The widget management module 30 may add new windows or add new views to the new windows according to the options available on the new city button 391 or the new view button 392.

The processor 50 may count a number of existing windows in the weather forecast widget which have been constructed. For example, the weather forecast widget has three windows: the first window 31, the second window 33, and the third window. Three is counted by the processor 50. The processor 50 may also count a number of existing views in each of the existing windows, such as numbers of the views in the first window 31, the second window 33, or the third window 35.

Each of existing windows includes an existing window ID code. Each existing window ID code of the existing window is calculated when the corresponding existing window is constructed. The existing window ID code is calculated through the following formula: $B+i*K$, where "i" is a natural number, "i" equals the number of existing windows. "B" is a static natural number and may be larger than the number of the existing windows. "K" is larger than the number of existing views in one existing window or the maximum number one window can accommodate. For example, when no window exists, user may want to construct the first window 31, the weather forecast widget has 0 existing windows, and each window can accommodate at most 8 views. "i" equals 0. "B" may be defined 1000 which is larger than 0. "K" may be defined 100, which is larger than 8. A window ID code of the first window 31 equals 1000+0*100=1000. In similar way, the window ID codes of the second window 33, and third window 35 are 1100 and 1200. A new window ID code of a new window may be calculated in the similar way.

Each of existing views of each of the existing windows includes an existing view ID code. Each existing view ID code of the existing view is calculated when the existing view corresponding to the new view ID code is constructed. The existing window ID code is calculated through existing window ID code+"j"+1, where "j" is a natural number and "j" is not larger than "K", and "j" equals the number of existing views in the corresponding window. For example, when there is no view existing in the first window, the user want to construct a first view, and the first window 31 has 8 views. The existing first window ID code is 1000. "j" equals 0. A view ID code of the first view equals 1000+0+1=1001. In similar way, the view ID codes of rest 7 views are 1002, 1003, 1004, 1005, 1006, 1007, and 1008. A new view ID code of a new view may also be calculated in the similar way.

Therefore, when one or more new windows and a plurality of new views in the new window are added to the weather forecast widget, a new window ID code of each new window may be calculated. The method of calculate is according to the number of the existing window and the number of the existing views in each of the existing windows. A new view ID code of each of the new views may be calculated according to the new window ID code.

The new views on the display 10 may be positioned in relation to the new window on the GUI 11. The display 10 may display the new views.

The source acquiring module 70 may acquire source information from the Internet weather database based on each of the new view ID code and associate the source information with the new view corresponding to the new view ID code.

Figure 3:
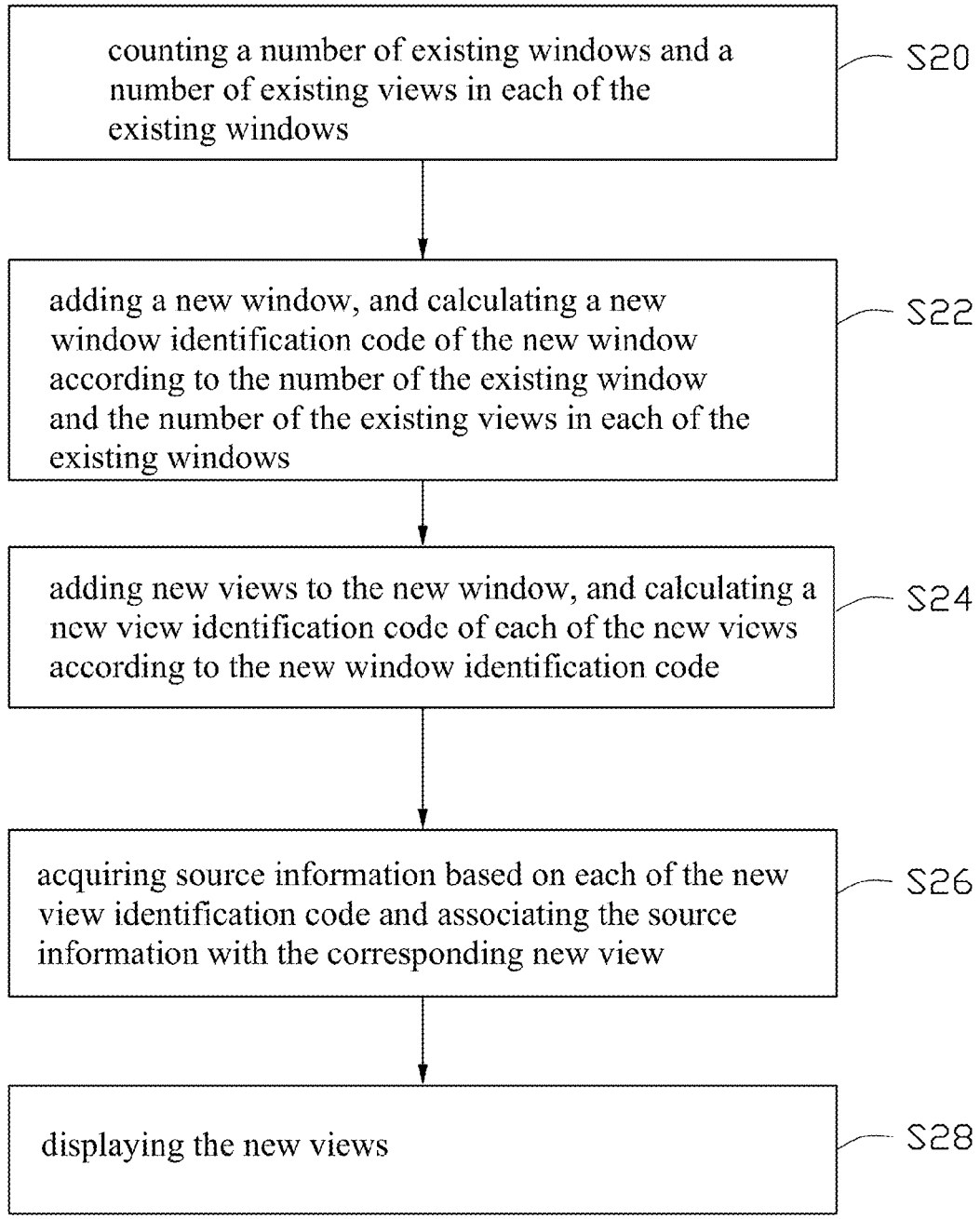
FIG. 3 is a flow chart of a method for configuring the widgets in an electronic device according to one embodiment.

Referring to FIG. 3, an embodiment of a computer-implemented method configuring widgets in an electronic device may include the following blocks.

Block B20, counting a number of existing windows and a number of existing views in each of the existing windows.

Block B22, adding a new window and calculating a new window identification code of the new window according to the number of the existing windows and the number of the existing views in each of the existing windows.

Block B24, adding new views to the new window and calculating a new view identification code of each of the new views according to the new window identification code.

Block B26, acquiring source information based on each of the new view identification codes and associating the particular source with the new view corresponding to the new view ID code.

Block B28, displaying the new views.

While the present disclosure has been illustrated by the description of the embodiments thereof, and while the embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A computer-implemented method for configuring widgets in an electronic device, comprising:

counting a number of existing windows and a number of existing views in each of the existing windows;

adding a new window, and calculating a new window identification code of the new window according to the number of the existing windows and the number of existing views in each of the existing windows, calculating the new window identification code for the new window according to $B+i*K$, where "i" is a natural number, "i" equals the number of existing windows; "B" is a static natural number, and is larger than the number of the existing windows, "K" is greater than the number of existing views in one existing window;

adding new views to the new window, and calculating a new view identification code of each of the new views according to the new window identification code, wherein calculating the new view identification code for each of the new views according to the new window identification code further comprises: calculating the new view identification code for each of the new views equals the number of the new window+"j"+1, where "j" is a natural number and "j" equals the number of existing views in the new window; and acquiring source information based on each of the new view identification code and associating the source information with new view corresponding to the new view identification code; and displaying the new views.

* * * * *